US012776459B2

(12) United States Patent
Chen

(10) Patent No.: US 12,776,459 B2
(45) Date of Patent: *Oct. 27, 2026

(54) KEYBOARD

(71) Applicant: Lite-On Technology Corporation, Taipei (TW)

(72) Inventor: Yi-Wen Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 162 days.

This patent is subject to a terminal disclaimer.

(21) Appl. No.: 18/610,296

(22) Filed: Mar. 20, 2024

(65) Prior Publication Data

US 2024/0234052 A1 Jul. 11, 2024

Related U.S. Application Data

(60) Continuation of application No. 18/325,135, filed on May 30, 2023, now Pat. No. 11,967,472, which is a (Continued)

(51) Int. Cl.

*H01H 13/83* (2006.01)
*H01H 13/704* (2006.01)
(Continued)

(52) U.S. Cl.

CPC ...... *H01H 13/7057* (2013.01); *H01H 13/704* (2013.01); *H01H 13/81* (2013.01); (Continued)

(58) Field of Classification Search

CPC ............. H01H 13/83; H01H 2219/062; H01H 2219/039; H01H 13/023; H01H 2219/06; (Continued)

(56) References Cited

U.S. PATENT DOCUMENTS 9,040,856 B2 * 5/2015 Chen .................... H01H 13/702 200/310
9,418,798 B2 * 8/2016 Nakatani ................ H01H 13/86
(Continued)

FOREIGN PATENT DOCUMENTS

CN 103413714 11/2013
CN 203983105 12/2014
(Continued)

OTHER PUBLICATIONS

"Office Action of China Counterpart Application", issued on Feb. 13, 2026, pp. 1-8.

*Primary Examiner* — Ahmed M Saeed

(74) *Attorney, Agent, or Firm* — JCIPRNET

(57) ABSTRACT

A keyboard including a backlight module, a base plate disposed on the backlight module, a membrane circuit disposed on the base plate, and a plurality of keycaps disposed on the membrane circuit is provided. The backlight module includes a light source and a reflective layer. The light source and a corresponding circuitry are arranged on the reflective layer, and a circuitry connecting portion extends from the reflective layer. The base plate has a positioning portion with an aperture, and a portion of the reflective layer contacts the base plate or the positioning portion.

12 Claims, 9 Drawing Sheets

Related U.S. Application Data division of application No. 17/694,700, filed on Mar. 15, 2022, now Pat. No. 11,705,295.

(60) Provisional application No. 63/160,957, filed on Mar. 15, 2021.

(51) Int. Cl.

*H01H 13/7057* (2006.01)
*H01H 13/81* (2006.01)
*H01H 3/12* (2006.01)

(52) U.S. Cl.

CPC ............. *H01H 13/83* (2013.01); *H01H 3/125* (2013.01); *H01H 2219/06* (2013.01); *H01H 2219/0621* (2013.01)

(58) Field of Classification Search

CPC ............... H01H 2221/07; H01H 9/181; H01H 2219/036; H01H 2219/044; H01H 2013/026; H01H 9/16; H01H 2219/0622; H01H 2219/037

See application file for complete search history.

(56) References Cited

U.S. PATENT DOCUMENTS

| | | | | |
|---|---|---|---|---|
| 10,629,395 | B1 * | 4/2020 | Fu | H01H 13/86 |
| 11,705,295 | B2 * | 7/2023 | Chen | H01H 13/83 200/310 |
| 11,967,472 | B2 * | 4/2024 | Chen | H01H 13/81 |
| 2014/0009903 | A1 * | 1/2014 | Peng | G02B 6/0055 362/23.03 |
| 2020/0041840 | A1 | 2/2020 | Hsu | |
| 2020/0273642 | A1 * | 8/2020 | Yen | G06F 1/1664 |
| 2023/0307195 | A1 * | 9/2023 | Chen | H01H 13/81 |

FOREIGN PATENT DOCUMENTS

| | | |
|---|---|---|
| CN | 204558321 | 8/2015 |
| CN | 206931517 | 1/2018 |

* cited by examiner

KEYBOARD

CROSS-REFERENCE TO RELATED APPLICATION

This application is a continuation application of and claims the priority benefit of U.S. application Ser. No. 18/325,135, filed on May 30, 2023. The prior U.S. application Ser. No. 18/325,135 is a divisional application of and claims the priority benefit of U.S. application Ser. No. 17/694,700, filed on Mar. 15, 2022, which claims the priority benefit of U.S. provisional application Ser. No. 63/160,957, filed on Mar. 15, 2021. The entirety of each of the above-mentioned patent applications is hereby incorporated by reference herein and made a part of this specification.

BACKGROUND

Technical Field

The disclosure relates to a keyboard. Particularly, the disclosure relates to an illuminated keyboard.

Description of Related Art

A keyboard is taken as a common physical input interface and is standard equipment of a notebook computer. With constantly increased demands for operating experience from users, an illuminated keyboard has thus been proposed to satisfy the users in the visual sensory experience. However, light emitted by a backlight module is likely to be emitted from an opening or an assembly gap of a keyboard mechanism, thereby resulting in light leakage and affecting the operating experience during the usage. Moreover, how to achieve assembly reliability and mechanism integration of the illuminated keyboard while meeting design requirements for thinning and light-weighting has been an issue that receives attention of relevant manufacturers.

SUMMARY

The disclosure provides a keyboard, which not only helps to improve light leakage or uneven luminous efficacy, but also helps to improve assembly reliability and mechanism integration.

According to an embodiment of the disclosure, a keyboard includes a backlight module, a base plate disposed on the backlight module, a membrane circuit disposed on the base plate, and a plurality of keycaps disposed on the membrane circuit. The backlight module includes a light source and a reflective layer. The light source and a corresponding circuitry are arranged on the reflective layer, and a circuitry connecting portion extends from the reflective layer. The base plate has a positioning portion with an aperture, and a portion of the reflective layer contacts the base plate or the positioning portion.

In the keyboard according to an embodiment of the disclosure, the backlight module further includes a shielding layer covering the light source, the shielding layer is provided with a light transmissive portion, and the portion of the reflective layer is exposed by the shielding layer at a position corresponding to the positioning portion.

In the keyboard according to an embodiment of the disclosure, the light transmissive portion of the shielding layer is optically connected to light transmissive portions of the base plate and the membrane circuit.

In the keyboard according to an embodiment of the disclosure, the backlight module further includes a light guide layer disposed between the base plate and the reflective layer, and the positioning portion is disposed corresponding to a through-hole of the light guide layer.

In the keyboard according to an embodiment of the disclosure, the backlight module further includes a shielding layer disposed between the light guide layer and the base plate. A part of the positioning portion of the base plate protrudes toward the membrane circuit, the reflective layer has an extension portion extending to the through-hole of the light guide layer to attached to the shielding layer.

In the keyboard according to an embodiment of the disclosure, the extension portion further extends through the shielding layer to be in contact with the positioning portion, and the positioning portion passes through the extension portion and the shielding layer.

In the keyboard according to an embodiment of the disclosure, the shielding layer has a shielding extension portion protruding toward the membrane circuit, the shielding extension portion is in contact with the positioning portion.

In the keyboard according to an embodiment of the disclosure, a part of the positioning portion protrudes toward the membrane circuit, and the positioning portion has a recess corresponding to the through-hole of the light guide layer.

In the keyboard according to an embodiment of the disclosure, the backlight module further includes a shielding layer disposed between the light guide layer and the base plate. The reflective layer has an extension portion extending to the through-hole of the light guide layer, and the extension portion covers a portion of the through-hole of the light guide layer and is attached to the shielding layer.

In the keyboard according to an embodiment of the disclosure, the extension portion further extends beyond the through-hole of the light guide layer and passes through the shielding layer to extend to the recess of the positioning portion.

In the keyboard according to an embodiment of the disclosure, the shielding layer has a shielding extension portion protruding toward the membrane circuit, and the shielding extension portion extends to the recess of the positioning portion.

In the keyboard according to an embodiment of the disclosure, the extension portion of the reflective layer protruding from the through-hole is exposed by an opening of the shielding layer.

In the keyboard according to an embodiment of the disclosure, a base portion of the positioning portion protrudes toward the reflective layer, and the portion of the reflective layer contacts the base portion.

In the keyboard according to an embodiment of the disclosure, the keyboard further includes a fixing member disposed at a position corresponding to the aperture, and the fixing member is engaged with a frame between two adjacent keycaps.

In the keyboard according to an embodiment of the disclosure, the portion of the reflective layer does not extend to the aperture.

According to another embodiment of the disclosure, a keyboard includes a backlight module, a base plate disposed on the backlight module, a membrane circuit disposed on the base plate, and a plurality of keycaps disposed on the membrane circuit. The backlight module includes a light source, a reflective layer, and a shielding layer. The light source is electrically connected to a circuitry arranged on the reflective layer or the shielding layer. The base plate has a positioning portion, and a portion of the membrane circuit has a non-uniform thickness corresponding to the positioning portion.

In the keyboard according to another embodiment of the disclosure, a connecting portion electrically connected to the light source extends from the corresponding reflective layer or shielding layer.

In the keyboard according to another embodiment of the disclosure, a portion of the reflective layer or of the shielding layer where the light source is arranged contacts the base plate or the positioning portion.

In the keyboard according to another embodiment of the disclosure, the light source is arranged optically corresponding to a light transmissive portion of the shielding layer.

In the keyboard according to another embodiment of the disclosure, the membrane circuit has a first portion corresponding to a position between two adjacent keycaps and a second portion adjacent to the first portion covered by one of the keycaps, and a thickness of the first portion is less than a thickness of the second portion.

In the keyboard according to another embodiment of the disclosure, the portion of the membrane circuit is provided with an opening facing the positioning portion.

Based on the foregoing, in the keyboard according to the embodiments of the disclosure, the base plate has the positioning portion for the fixing member to be fixed, to improve assembly reliability and mechanism integration of the keyboard while meeting design requirements for thinning and light-weighting. In addition, the positioning portion of the base plate is disposed corresponding to the through-hole of the light guide layer, and the shielding layer and the reflective layer are in contact with each other in the through-hole of the light guide layer, to block the transmission path of light emitted from the through-hole of the light guide layer to the positioning portion of the base plate, prevent light from being emitted from the gap between the fixing member and the backlight module, and thereby improve light leakage or uneven luminous efficacy.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
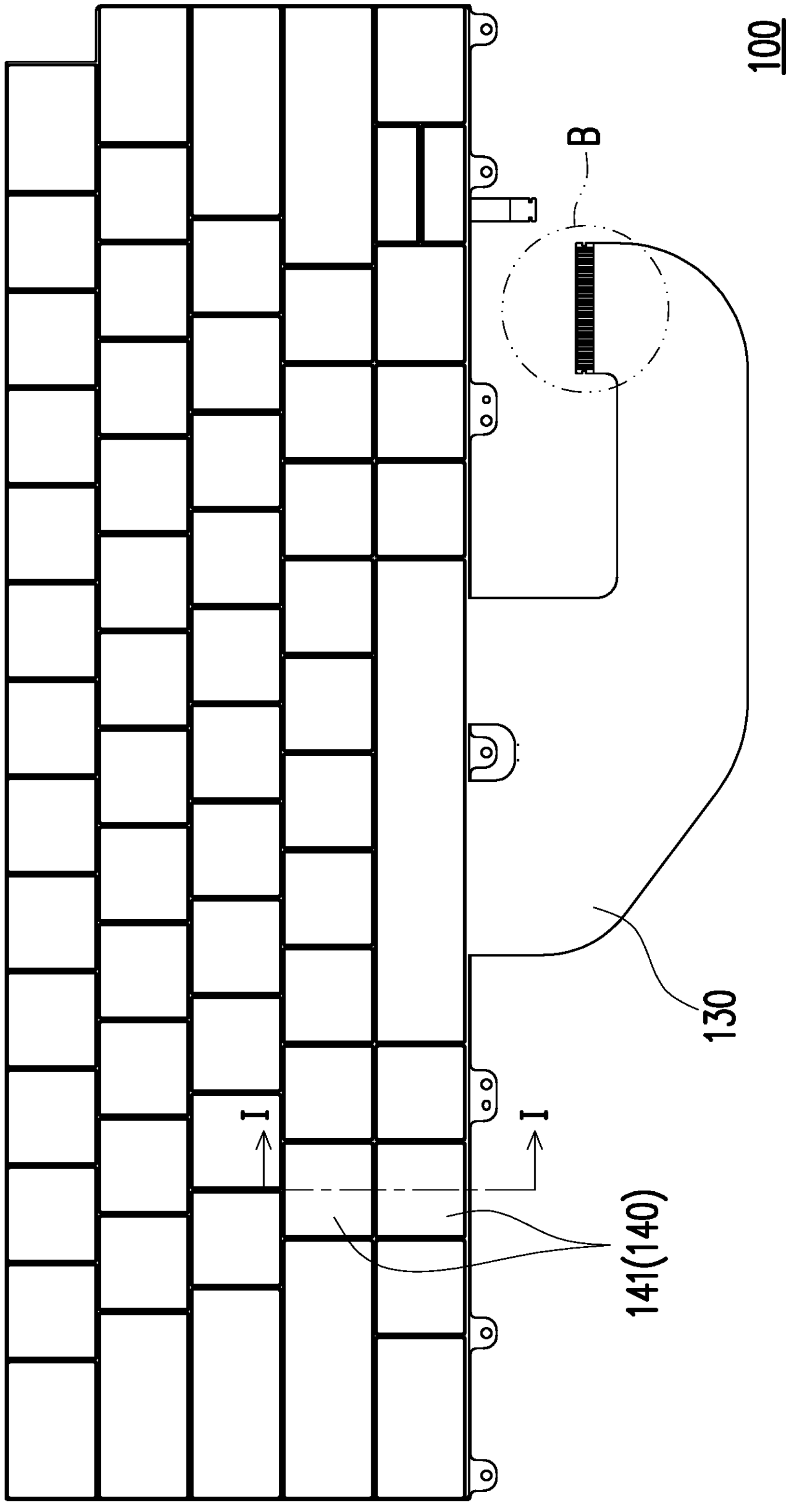
FIG. 1 is a schematic top view of a keyboard according to an embodiment of the disclosure.

Reference will now be made in detail to exemplary embodiments of the disclosure, examples of which are illustrated in the accompanying drawings. Wherever possible, the same reference numerals are used in the drawings and description to denote the same or similar parts.

Figure 2:
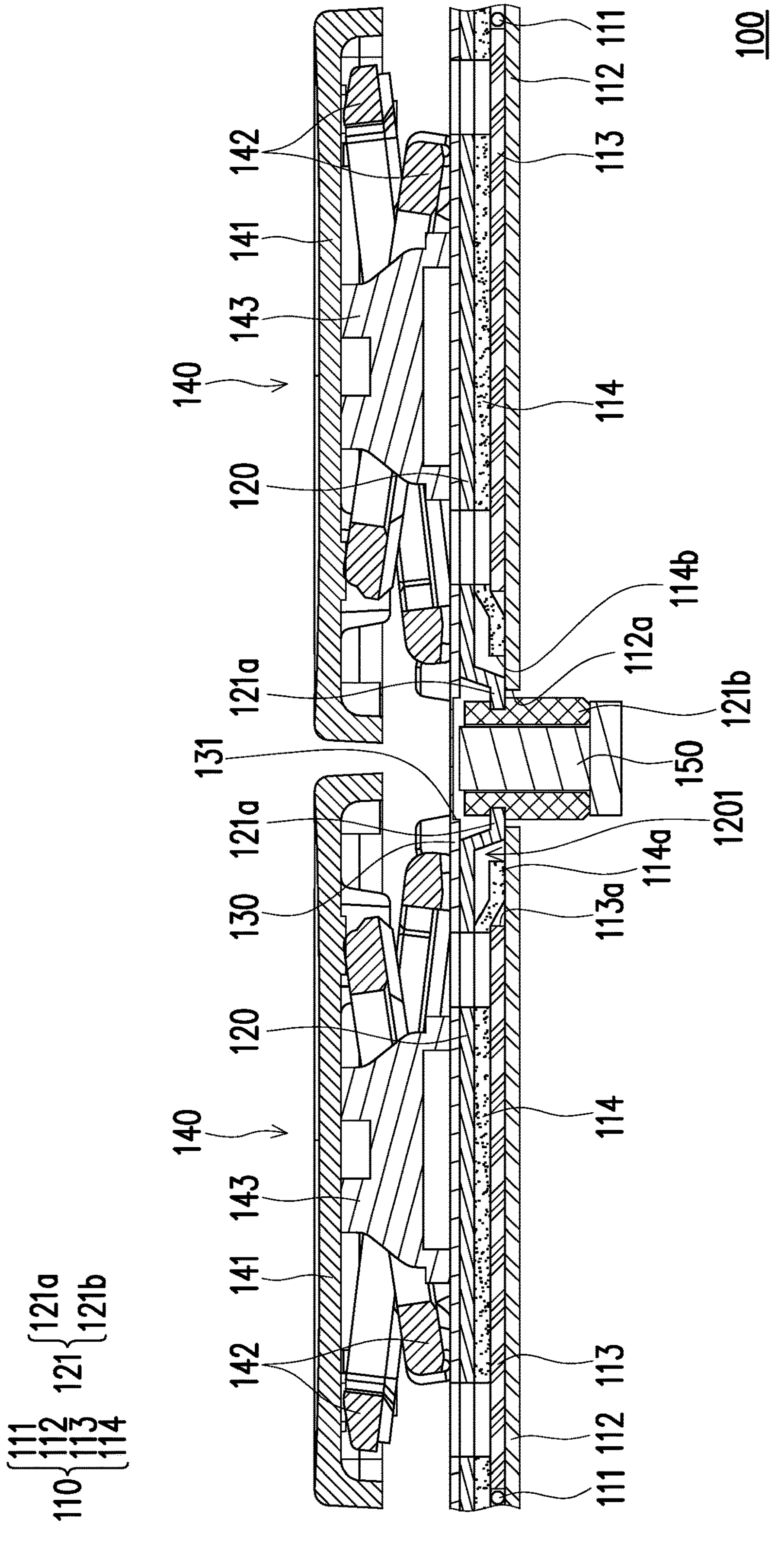
FIG. 2 is a schematic partial cross-sectional view of the keyboard of FIG. 1 along section line I-I.

FIG. 1 is a schematic top view of a keyboard according to an embodiment of the disclosure. FIG. 2 is a schematic partial cross-sectional view of the keyboard of FIG. 1 along section line I-I. With reference to FIG. 1 and FIG. 2, in this embodiment, a keyboard 100 may be an illuminated keyboard, and is adapted to be integrated into a notebook computer or applied to other electronic devices. To be specific, the keyboard 100 includes a backlight module 110, a base plate 120, a membrane circuit 130, and a plurality of key structures 140. The base plate 120 is disposed on the backlight module 110. The membrane circuit 130 is disposed on the base plate 120. In addition, the plurality of key structures 140 are disposed on the membrane circuit 130, and each key structure 140 includes a keycap 141, a supporting structure 142, and an elastic member 143. The supporting structure 142 and the elastic member 143 are disposed between the keycap 141 and the membrane circuit 130. The keycap 141 may be supported and assisted by the supporting structure 142 and the elastic member 143 to move up and down above the membrane circuit 130. The supporting structure 142 between the keycap 141 and the base plate 120 may be a scissor-like structure or other linking rod structures. The elastic member 143 may be a rubber dome switch or a metal dome switch.

As shown in FIG. 2, the backlight module 110 includes a light source 111, a reflective layer 112, a light guide layer 113, and a shielding layer 114. The light guide layer 113 is disposed on the reflective layer 112. The shielding layer 114 is disposed on the light guide layer 113. The light source 111 is disposed corresponding to the light guide layer 113. The light guide layer 113 is located between the shielding layer 114 and the reflective layer 112. Light-emitting diodes or other suitable light-emitting components may be adopted for the light source 111. Light emitted by the light source 111 is adapted to be emitted to the keycap 141 by conduction of the light guide layer 113. Generally, the shielding layer 114, the base plate 120, and the membrane circuit 130 each have a light transmissive portion. The light transmissive portions of the shielding layer 114, the base plate 120, and the membrane circuit 130 are disposed corresponding to (but not limited to being completely overlapping) each other, and fall within an area of the orthographic projection of the keycap 141, for light to be emitted from the light guide layer 113 to the keycap 141 through the light transmissive portions of the shielding layer 114, the base plate 120, and the membrane circuit 130.

In this embodiment, the light guide layer 113 has a through-hole 113*a*. The shielding layer 114 and the reflective layer 112 are in contact with each other in the through-hole 113*a* of the light guide layer 113. The base plate 120 is disposed on the shielding layer 114. The membrane circuit 130 is disposed on the base plate 120. The base plate 120 has a positioning portion 121 disposed corresponding to the through-hole 113*a* of the light guide layer 113. The positioning portion 121 protrudes toward the reflective layer 112. In an embodiment, a fixing member 150 (e.g., a screw, a heat stake, or a buckle) may be fixed in the positioning portion 121 to assemble the keyboard 100 to a notebook computer or other electronic device, to improve assembly reliability and mechanism integration of the keyboard 100 while meeting design requirements for thinning and light-weighting. In addition, the membrane circuit 130 has an opening 131 facing the positioning portion 121 to accommodate at least a part of the positioning portion 121 and the end of the assembled fixing member 150, thereby meeting design requirements for thinning and light-weighting. In an embodiment, the opening 131 may be a blind hole to block the line of sight of a user from directly seeing the positioning portion 121 below the membrane circuit 130 from the outside of the key structures 140. For example, the membrane circuit 130 includes a multi-layer structure (not shown), for example, an upper circuit layer, a spacer layer, and a lower circuit layer, stacked in an extension direction from the keycap 141 to the base plate 120. The spacer layer and the lower circuit layer at locations corresponding to the opening 131 have through-holes to prevent the positioning portion 121 from interfering with the membrane circuit 130 and damaging the circuit structure therein.

As shown in FIG. 2, the positioning portion 121 of the base plate 120 is located between two adjacent key structures 140. Since the shielding layer 114 and the reflective layer 112 are in contact with each other in the through-hole 113*a* of the light guide layer 113, the shielding layer 114 and the reflective layer 112 can block the transmission path of light emitted from the through-hole 113*a* of the light guide layer 113 to the positioning portion 121 of the base plate 120, prevent light from being emitted from the gap between the positioning portion 121 (or the fixing member 150) and the backlight module 110, and thereby improve light leakage or uneven luminous efficacy. Specifically, the shielding layer 114 has a shielding extension portion 114*a* extending to the through-hole 113*a* of the light guide layer 113. The shielding extension portion 114*a* covers an inner wall of the through-hole 113*a* of the light guide layer 113 and is in contact with the reflective layer 112. For example, the shielding extension portion 114*a* may or may not be in contact with the inner wall of the through-hole 113*a* to be glued and attached to the reflective layer 112. Therefore, the shielding extension portion 114*a* can block the transmission path of light emitted from the inner wall of the through-hole 113*a* of the light guide layer 113 to the positioning portion 121 of the base plate 120.

As shown in FIG. 2, the reflective layer 112 extends to a side of the through-hole 113*a* of the light guide layer 113. The shielding layer 114 turns into the through-hole 113*a* of the light guide layer 113 and extends toward the reflective layer 112 to be in contact with the reflective layer 112.

In this embodiment, the positioning portion 121 extends to the through-hole 113*a* of the light guide layer 113 and is in contact with the reflective layer 112. Specifically, the positioning portion 121 includes a base portion 121*a* and a fixing portion 121*b* engaged with the base portion 121*a*. The base portion 121*a* is in contact with the reflective layer 112. The fixing portion 121*b* penetrates the reflective layer 112. The base portion 121*a* is, for example, a recess portion that is formed by stamping the material of the base plate 120 and extends toward a side away from the keycap 141. The fixing portion 121*b* may be a screw boss, and is aligned with the opening 131 of the membrane circuit 130 for the fixing member 150 to be fixed therein. More specifically, the shielding layer 114 has an opening 114*b* partially overlapping the through-hole 113*a* of the light guide layer 113. The reflective layer 112 has an opening 112*a* partially overlapping the through-hole 113*a* of the light guide layer 113 and with the opening 114*b* of the shielding layer 114. The opening 114*b* of the shielding layer 114 falls within the through-hole 113*a* of the light guide layer 113. The reflective layer 112 is partially exposed from the opening 114*b* of the shielding layer 114. The base portion 121*a* extends to the opening 114*b* of the shielding layer 114 to be in contact with the reflective layer 112. In addition, the fixing portion 121*b* passes through the opening 112*a* of the reflective layer 112. Since the positioning portion 121 protrudes toward the reflective layer 112, and a recess 1201 corresponding to the through-hole 113*a* of the light guide layer 113 is present at the junction between the body and the positioning portion 121 of the base plate 120, the reflective layer 112 covering the base portion 121*a* can further prevent light leakage caused by light leaked from the glued part between the shielding layer 114 and the reflective layer 112 being reflected by the recess 1201 and emitted from the gap between the base portion 121*a* and the backlight module 110.

Figure 3:
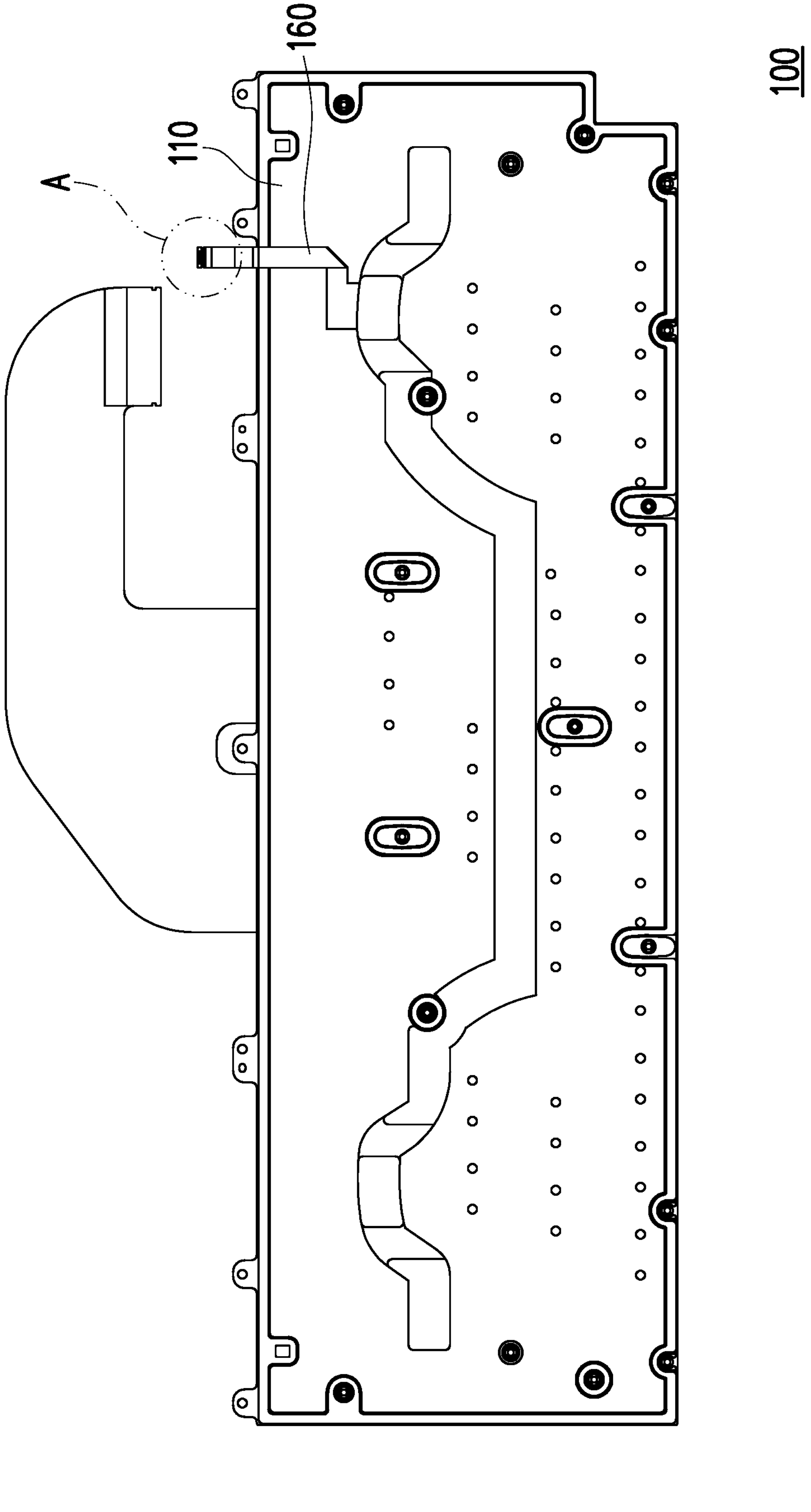
FIG. 3 is a schematic bottom view of the keyboard of FIG. 1.
Figure 4:
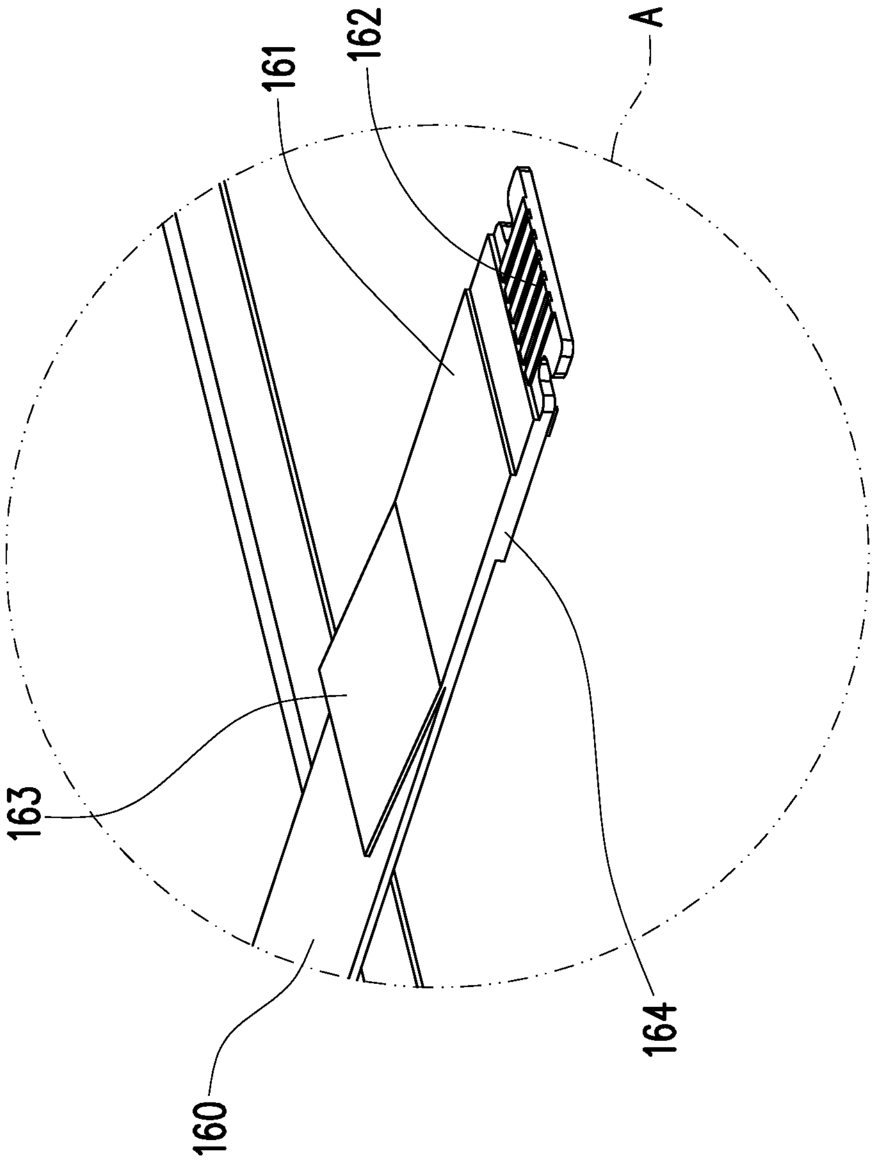
FIG. 4 is a schematic perspective view of region A of FIG. 3.

FIG. 3 is a schematic bottom view of the keyboard of FIG. 1. FIG. 4 is a schematic perspective view of region A of FIG. 3. With reference to FIG. 3 and FIG. 4, the keyboard 100 further includes a flexible circuit layer 160 connected to the backlight module 110. The light source 111 (as shown in FIG. 2) is disposed on and electrically connected to the flexible circuit layer 160. The flexible circuit layer 160 includes a connecting portion 161, a terminal 162 disposed at an end of the connecting portion 161, and a tab 163 connected to the connecting portion 161. The tab 163 and the terminal 162 are located on a same side of the connecting portion 161 to facilitate disassembly and assembly of the connecting portion 161 through the tab 163 by an operator. In addition, the flexible circuit layer 160 further includes a stiffener 164 protruding from a side of the connecting portion 161. The stiffener 164 is disposed close to the terminal 162. The terminal 162 and the stiffener 164 are respectively located on opposite sides of the connecting portion 161. Further, the stiffener 164 may be configured to improve the structural strength of the connecting portion 161 and reduce the probability of being damaged during disassembly and assembly. It is noted that the flexible circuit layer 160 illustrated in FIG. 3 is, for example, an additional flexible printed circuit board disposed on one side of the reflective layer 112. In another embodiment, the flexible circuit layer 160 could be integrated with the reflective layer 112 or the shielding layer 114; that is, the light source 111 and the corresponding circuitry could be arranged on the reflective layer 112 or the shielding layer 114 with the connecting portion 161 extending outwards and being electrically connected to the light source 111.

Figure 5:
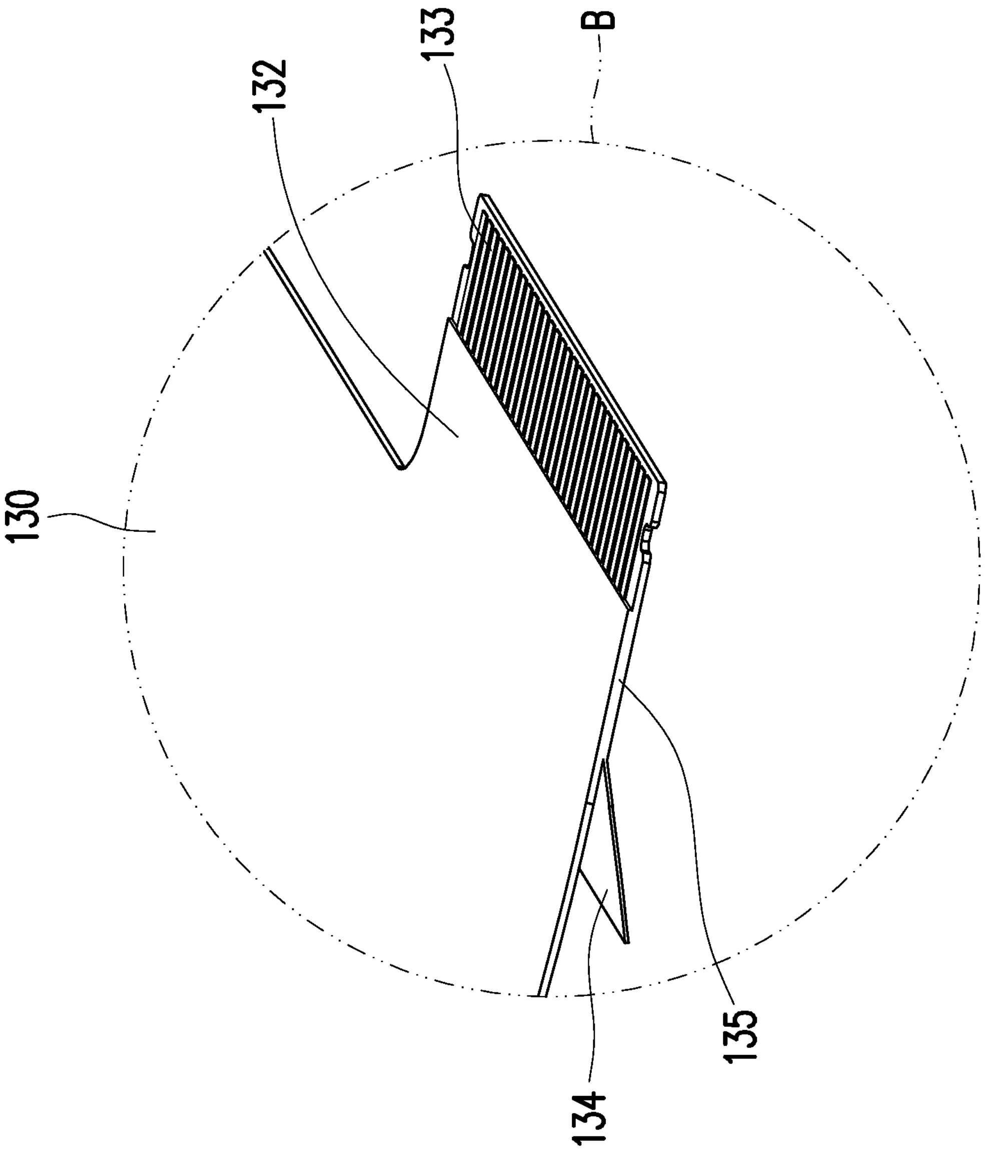
FIG. 5 is a schematic perspective view of region B of FIG. 1.

FIG. 5 is a schematic perspective view of region B of FIG. 1. With reference to FIG. 1 and FIG. 5, the membrane circuit 130 includes a connecting portion 132, a terminal 133 disposed at an end of the connecting portion 132, and a tab 134 connected to the connecting portion 132. The tab 134 and the terminal 133 are respectively located on opposite sides of the connecting portion 132, to facilitate disassembly and assembly of the connecting portion 132 through the tab 134 by an operator. In addition, the membrane circuit 130 further includes a stiffener 135 protruding from a side of the connecting portion 132. The stiffener 135 is disposed close to the terminal 133. The terminal 133 and the stiffener 135 are respectively located on opposite sides of the connecting portion 132. Moreover, the tab 134 may extend from the stiffener 135. Further, the stiffener 135 may be configured to improve the structural strength of the connecting portion 132 and reduce the probability of being damaged during disassembly and assembly.

Figure 6:
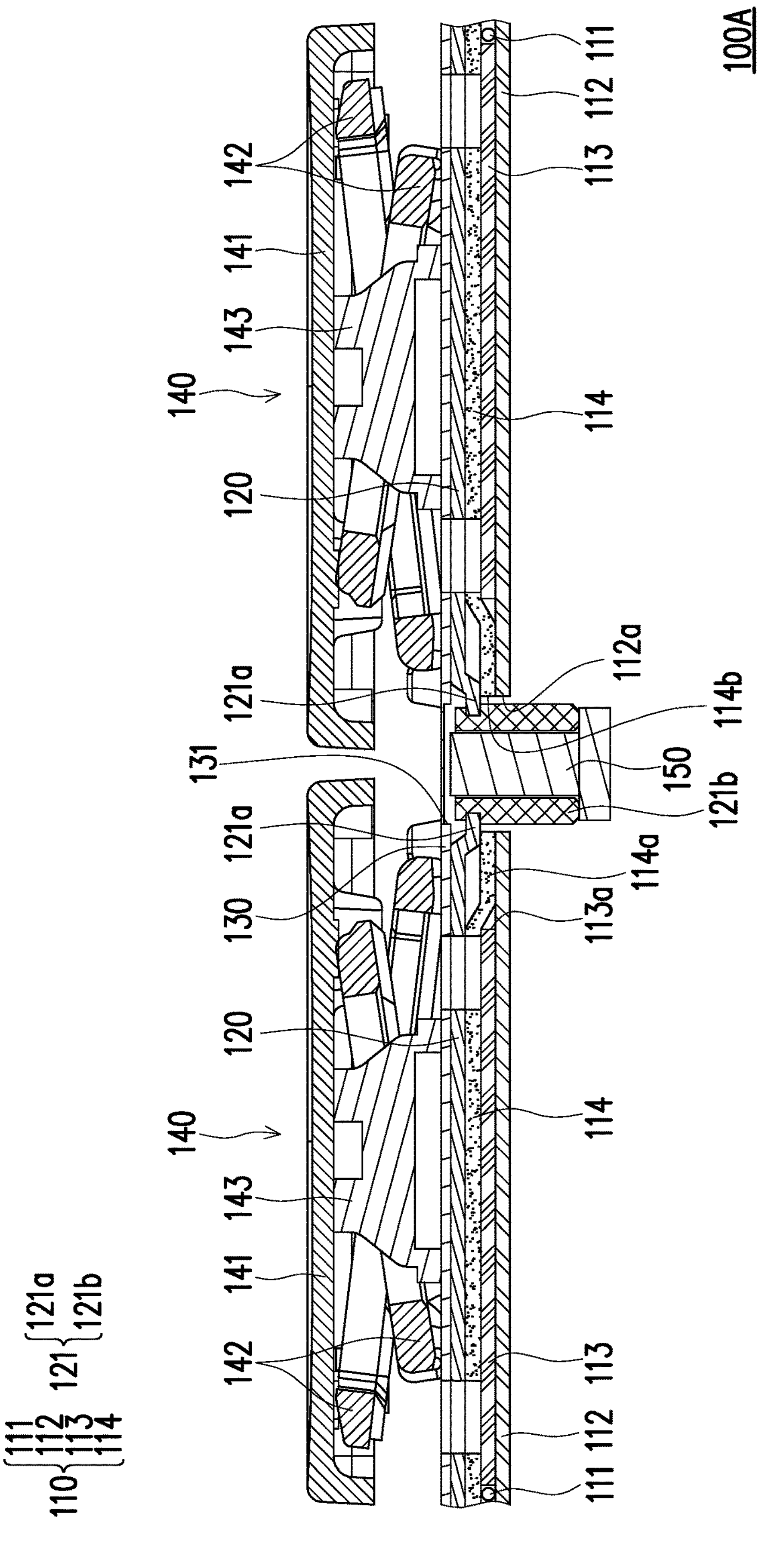
FIG. 6 is a schematic partial cross-sectional view of a keyboard according to another embodiment of the disclosure.

FIG. 6 is a schematic partial cross-sectional view of a keyboard according to another embodiment of the disclosure. With reference to FIG. 6, a keyboard 100A of this embodiment and the keyboard 100 shown in FIG. 2 have approximately the same design, and the main difference between them is that, in the keyboard 100A of this embodiment, the base portion 121*a* of the positioning portion 121 is not in contact with the reflective layer 112, but in contact with the shielding extension portion 114*a* of the shielding layer 114. Accordingly, the shielding layer 114 (the shielding extension portion 114*a*) covering the base portion 121*a* can further prevent light leakage caused by light leaked from the attached part between the shielding layer 114 and the reflective layer 112 being reflected by the base plate 120.

Figure 7:
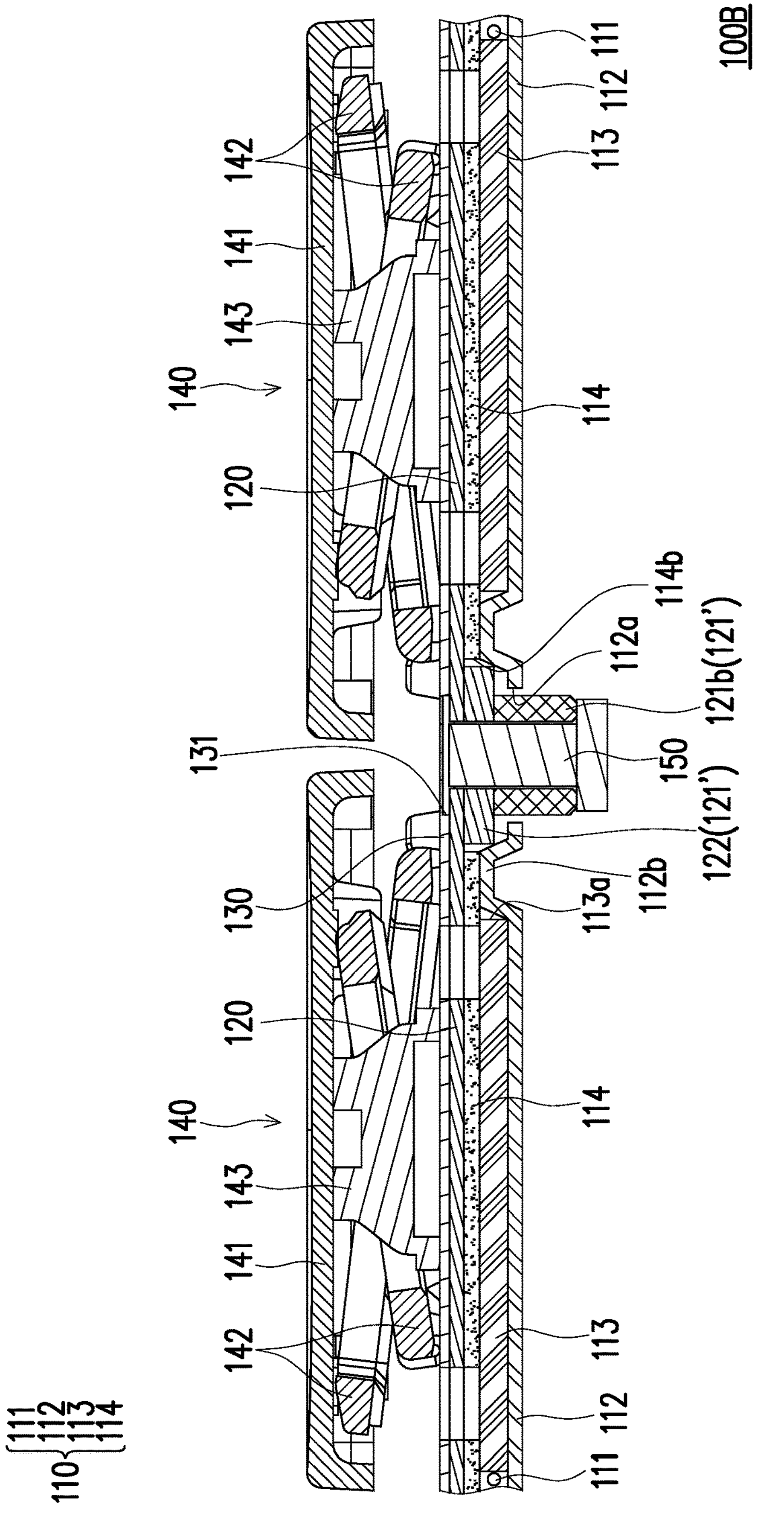
FIG. 7 is a schematic partial cross-sectional view of a keyboard according to still another embodiment of the disclosure.

FIG. 7 is a schematic partial cross-sectional view of a keyboard according to still another embodiment of the disclosure. With reference to FIG. 7, a keyboard 100B of this embodiment and the keyboard 100 shown in FIG. 2 have approximately the same design, and the main differences between them are that, in the keyboard 100B of this embodiment, the reflective layer 112 has a reflective extension portion 112*b* extending to the through-hole 113*a* of the light guide layer 113. In addition, the reflective extension portion 112*b* covers the inner wall of the through-hole 113*a* of the light guide layer 113 and is in contact with the shielding layer 114. For example, the reflective extension portion 112*b* is glued and attached to the shielding layer 114. Therefore, the reflective extension portion 112*b* can block the transmission path of light emitted from the inner wall of the through-hole 113*a* of the light guide layer 113 to a positioning portion 121' of the base plate 120.

As shown in FIG. 7, the shielding layer 114 extends to a side of the through-hole 113*a* of the light guide layer 113. The reflective layer 112 turns into the through-hole 113*a* of the light guide layer 113 and extends toward the shielding layer 114 to be in contact with the shielding layer 114. In addition, the positioning portion 121' of this embodiment includes a connecting piece 122 and the fixing portion 121*b* engaged with the connecting piece 122. The connecting piece 122 is, for example, a metal gasket having a hole. One end of the fixing portion 121*b* is disposed in the hole of the connecting piece 122 and extends downward from the connecting piece 122. The connecting piece 122 may be fastened to the body of the base plate 120 by riveting or welding to connect the positioning portion 121' to the lower surface of the body of the base plate 120. Therefore, the reflective layer 112 covering part of the connecting piece 122 can reduce light leakage caused by light being reflected by the base plate 120 or the positioning portion 121'.

Figure 8:
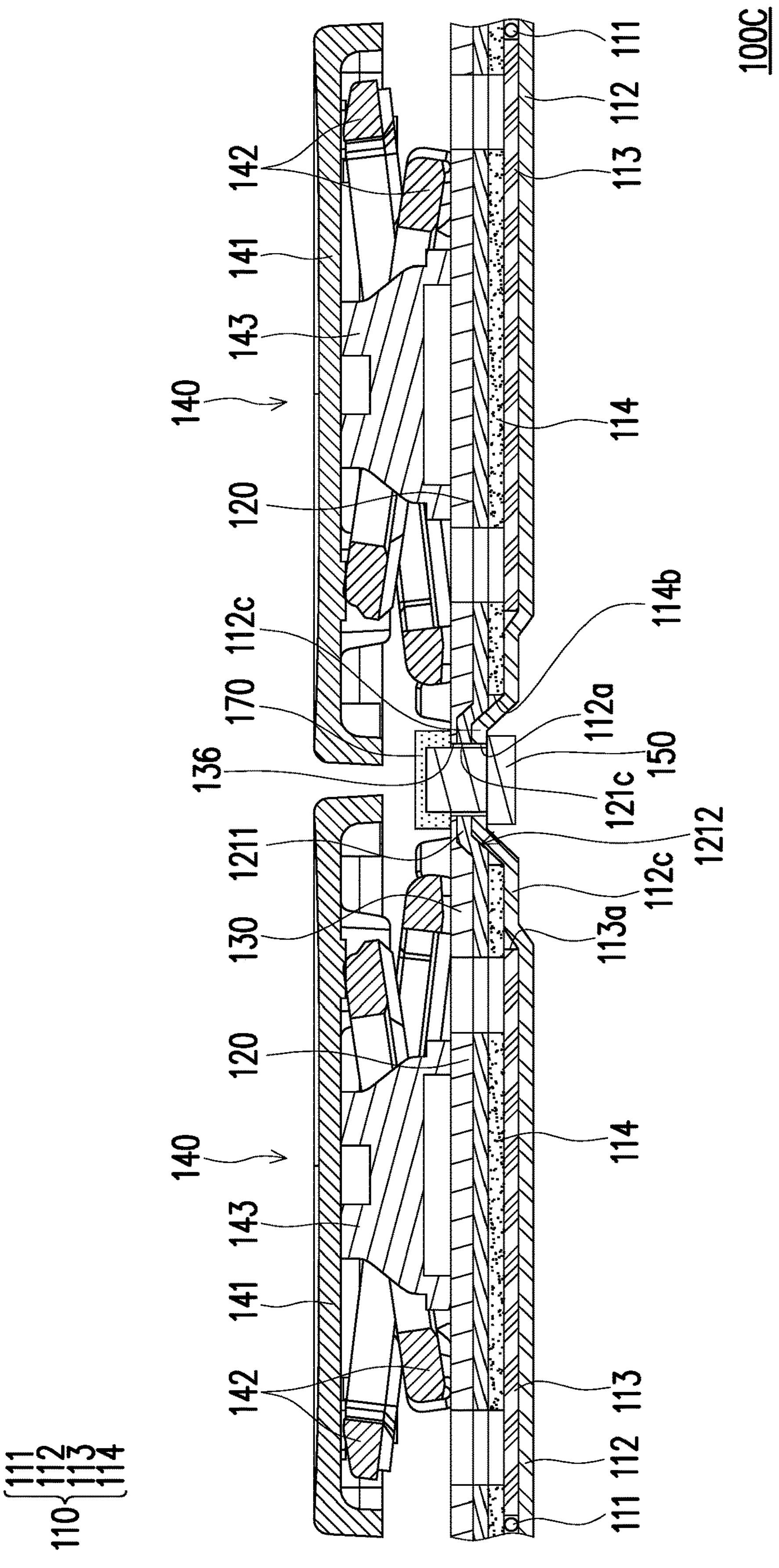
FIG. 8 is a schematic partial cross-sectional view of a keyboard according to yet another embodiment of the disclosure.

FIG. 8 is a schematic partial cross-sectional view of a keyboard according to yet another embodiment of the disclosure. With reference to FIG. 8, a keyboard 100C of this embodiment and the keyboard 100 shown in FIG. 2 have approximately the same design, and the main difference between them is the structural design of the positioning portion. In the keyboard 100C of this embodiment, a positioning portion 1211 protrudes toward the membrane circuit 130 and has a recess 1212 facing the backlight module 110. In addition, the reflective layer 112 has a reflective extension portion 112*c* extending to the through-hole 113*a* of the light guide layer 113. The reflective extension portion 112*c* covers the inner wall of the through-hole 113*a* of the light guide layer 113 and is in contact with the shielding layer 114. For example, the reflective extension portion 112*c* is glued and attached to the shielding layer 114. Therefore, the reflective extension portion 112*c* can block the transmission path of light emitted from the inner wall of the through-hole 113*a* of the light guide layer 113 to the positioning portion 1211 of the base plate 120.

As shown in FIG. 8, the reflective extension portion 112*c* further extends beyond the through-hole 113*a* of the light guide layer 113 and passes through the opening 114*b* of the shielding layer 114 to extend to the recess 1212 of the positioning portion 1211 and be in contact with the inner surface of the recess 1212, thereby reducing light leakage caused by leaked light reflected by the inner surface of the recess 1212. In addition, the fixing member 150 passes through the reflective extension portion 112*c* of the reflective layer 112, the positioning portion 1211, and the membrane circuit 130, and is engaged with a frame 170 disposed on the membrane circuit 130. Further, the opening 112*a* of the reflective layer 112 falls on the reflective extension portion 112*c*. The positioning portion 1211 has an opening 121*c* corresponding to the opening 112*a*. The membrane circuit 130 has an opening 136 corresponding to the opening 121*c*. The fixing member 150 sequentially passes through the opening 112*a* of the reflective layer 112, the opening 121*c* of the positioning portion 1211, and the opening 136 of the membrane circuit 130, and is engaged with the frame 170.

Figure 9:
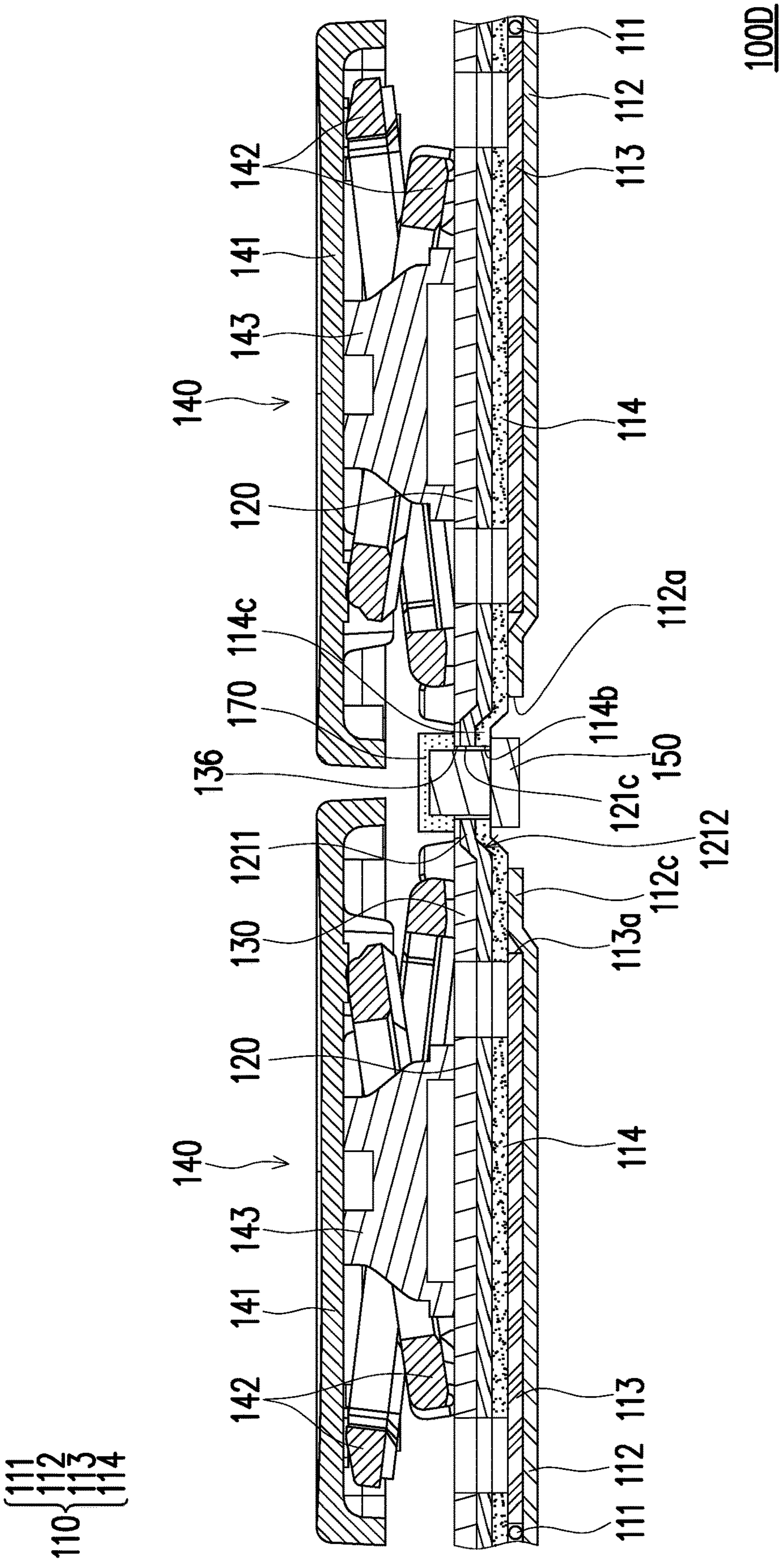
FIG. 9 is a schematic partial cross-sectional view of a keyboard according to still another embodiment of the disclosure.

FIG. 9 is a schematic partial cross-sectional view of a keyboard according to still another embodiment of the disclosure. With reference to FIG. 9, a keyboard 100D of this embodiment and the keyboard 100C shown in FIG. 8 have approximately the same design, and the main differences between them are that, in the keyboard 100D of this embodiment, the reflective extension portion 112*c* does not extend beyond the through-hole 113*a* of the light guide layer 113, nor passes through the opening 114*b* of the shielding layer 114. Correspondingly, the shielding layer 114 has a shielding extension portion 114*c* protruding toward the membrane circuit 130. The shielding extension portion 114*c* extends to the recess 1212 of the positioning portion 1211 and is in contact with the inner surface of the recess 1212.

As shown in FIG. 9, the fixing member 150 passes through the shielding extension portion 114*c* of the shielding layer 114, the positioning portion 1211, and the membrane circuit 130, and is engaged with the frame 170. Further, the opening 114*b* of the shielding layer 114 falls on the shielding extension portion 114*c*. The positioning portion 1211 has the opening 121*c* corresponding to the opening 114*b*. The membrane circuit 130 has the opening 136 corresponding to the opening 121*c*. The fixing member 150 sequentially passes through the opening 114*b* of the shielding layer 114, the opening 121*c* of the positioning portion 1211, and the opening 136 of the membrane circuit 130, and is engaged with the frame 170.

In summary of the foregoing, in the keyboard according to the embodiments of the disclosure, the base plate has the positioning portion for the fixing member to be fixed, to improve assembly reliability and mechanism integration of the keyboard while meeting design requirements for thinning and light-weighting. In addition, the positioning portion of the base plate is disposed corresponding to the through-hole of the light guide layer, and the shielding layer and the reflective layer are in contact with each other in the through-hole of the light guide layer, to block the transmission path of light emitted from the through-hole of the light guide layer to the positioning portion of the base plate, prevent light from being emitted from the gap between the fixing member and the backlight module, and thereby improve light leakage or uneven luminous efficacy.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A keyboard, comprising:

a backlight module, comprising a light source and a reflective layer, wherein the light source and circuitry are arranged on the reflective layer, and a circuitry connecting portion extends from the reflective layer;

a base plate, disposed on the backlight module, wherein the base plate has a positioning portion with an aperture, and a portion of the reflective layer contacts the base plate or the positioning portion, wherein the backlight module further comprises a shielding layer covering the light source, the shielding layer is provided with a light transmissive portion, and the portion of the reflective layer is exposed by the shielding layer at a position corresponding to the positioning portion;

a membrane circuit, disposed on the base plate; and a plurality of keycaps, disposed on the membrane circuit.

2. The keyboard according to claim 1, wherein the light transmissive portion of the shielding layer is optically connected to light transmissive portions of the base plate and the membrane circuit.

3. The keyboard according to claim 1, wherein the backlight module further comprises a light guide layer disposed between the base plate and the reflective layer, and the positioning portion is disposed corresponding to a through-hole of the light guide layer.

4. The keyboard according to claim 3, wherein a part of the positioning portion protrudes toward the membrane circuit, and the positioning portion has a recess corresponding to the through-hole of the light guide layer.

5. The keyboard according to claim 1, wherein a base portion of the positioning portion protrudes toward the reflective layer, and the portion of the reflective layer contacts the base portion.

6. The keyboard according to claim 1, further comprising a fixing member disposed at a position corresponding to the aperture, and the fixing member is engaged with a frame between two adjacent keycaps.

7. The keyboard according to claim 1, wherein the portion of the reflective layer does not extend to the aperture.

8. A keyboard, comprising:

a backlight module, comprising a light source, a reflective layer, and a shielding layer, wherein the light source is electrically connected to circuitry arranged on the reflective layer or the shielding layer;

a base plate, disposed on the backlight module, wherein the base plate has a positioning portion, and a portion of the reflective layer contacts the base plate or the positioning portion, wherein the shielding layer covers the light source, the shielding layer is provided with a light transmissive portion, and the portion of the reflective layer is exposed by the shielding layer at a position corresponding to the positioning portion;

a membrane circuit, disposed on the base plate, wherein a portion of the membrane circuit has a non-uniform thickness corresponding to the positioning portion; and a plurality of keycaps, disposed on the membrane circuit.

9. The keyboard according to claim 8, wherein a connecting portion electrically connected to the light source extends from the corresponding reflective layer or shielding layer.

10. The keyboard according to claim 8, wherein a portion of the reflective layer or of the shielding layer where the light source is arranged contacts the base plate or the positioning portion.

11. The keyboard according to claim 8, wherein the light source is arranged optically corresponding to a light transmissive portion of the shielding layer.

12. The keyboard according to claim 8, wherein the membrane circuit has a first portion corresponding to a position between two adjacent keycaps and a second portion adjacent to the first portion covered by one of the keycaps, and a thickness of the first portion is less than a thickness of the second portion.

* * * * *